(12) United States Patent
Yamauchi et al.

(10) Patent No.: US 7,215,442 B2
(45) Date of Patent: May 8, 2007

(54) IMAGE FORMATION APPARATUS AND IMAGE FORMATION METHOD

(75) Inventors: Yasuki Yamauchi, Ashigarakami-gun (JP); Kunio Yamada, Ebina (JP); Takashi Yamamuro, Ebina (JP); Makoto Hirota, Ebina (JP); Toru Misaizu, Ebina (JP); Akira Ishii, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1016 days.

(21) Appl. No.: 10/373,798

(22) Filed: Feb. 27, 2003

(65) Prior Publication Data

US 2004/0036896 A1    Feb. 26, 2004

(30) Foreign Application Priority Data

Aug. 20, 2002    (JP)    ............................. 2002-239885

(51) Int. Cl.
*H04N 1/50*    (2006.01)
*H04N 1/60*    (2006.01)

(52) U.S. Cl. ....................... 358/1.9; 358/518; 358/523; 358/3.23

(58) Field of Classification Search ................. 358/1.9, 358/3.23, 504, 518, 523; 382/285; 347/115, 347/188; 399/130, 183, 194
See application file for complete search history.

(56) References Cited

U.S. PATENT DOCUMENTS

| 6,819,881 B2 * | 11/2004 | Kurita et al. | .................. 399/12 |
| 6,845,219 B2 * | 1/2005 | Yamamuro et al. | ........... 399/13 |
| 6,885,830 B2 * | 4/2005 | Hirota et al. | ................. 399/12 |

FOREIGN PATENT DOCUMENTS

| JP | A 2000-131875 | 5/2000 |
| JP | A 2001-134006 | 5/2001 |
| JP | 2002278370 A * | 9/2002 |

* cited by examiner

*Primary Examiner*—Thomas D. Lee
(74) *Attorney, Agent, or Firm*—Oliff & Berridge PLC (57) ABSTRACT

An image formation apparatus for forming a three dimensional print image on a recording medium by an image of three dimensional printing material and an image of color material in accordance with image data, comprises a designation unit for designating a three dimensional print region using three dimensional printing material and a non-three dimensional print region, with regard to the image data; and an image processing unit for performing different color conversions on the image data depending on the three dimensional print region and the non-three dimensional print region designated by the designation unit.

8 Claims, 10 Drawing Sheets

FIG.1

FIG.2A TRANSFER PROCESS (Y)

FIG.2B TRANSFER PROCESS (M)

FIG.2C TRANSFER PROCESS (C)

FIG.2D TRANSFER PROCESS (K)

FIG.2E TRANSFER PROCESS (H)

FIG.2F SECONDARY TRANSFER PROCESS

FIG.2G FIXING PROCESS

FIG.3

L*a*b*H →YMCKH

*3531*

| L* | a* | b* | H | Y | M | C | K | H |
|---|---|---|---|---|---|---|---|---|
| L*1 | a*1 | b*1 | H1 | Y1 | M1 | C1 | K1 | H1 |
| L*2 | a*2 | b*2 | H2 | Y2 | M2 | C2 | K2 | H2 |
| L*3 | a*3 | b*3 | H3 | Y3 | M3 | C3 | K3 | H3 |
| ⋮ | ⋮ | ⋮ | ⋮ | ⋮ | ⋮ | ⋮ | ⋮ | ⋮ |

COLOR CONVERSION COEFFICIENT TABLE 1

FIG.4A

L*a*b* →YMCK

*3532*

| L* | a* | b* | Y | M | C | K |
|---|---|---|---|---|---|---|
| L*11 | a*11 | b*11 | Y11 | M11 | C11 | K11 |
| L*21 | a*12 | b*21 | Y21 | M21 | C21 | K21 |
| L*31 | a*31 | b*31 | Y31 | M31 | C31 | K31 |
| ⋮ | ⋮ | ⋮ | ⋮ | ⋮ | ⋮ | ⋮ |

COLOR CONVERSION COEFFICIENT TABLE 2

L*a*b*H →YMCKH
/L*a*b* →YMCK

| | L* | a* | b* | H | Y | M | C | K | H | |
|---|---|---|---|---|---|---|---|---|---|---|
| CW1 | L*1 | a*1 | b*1 | H1 | Y1 | M1 | C1 | K1 | H1 | 3531 |
| USABLE COLOR GAMUT | L*2 | a*2 | b*2 | H2 | Y2 | M2 | C2 | K2 | H2 | TABLE 1 |
| | L*3 | a*3 | b*3 | H3 | Y3 | M3 | C3 | K3 | H3 | |
| CW2 | ⋮ | ⋮ | ⋮ | ⋮ | ⋮ | ⋮ | ⋮ | ⋮ | ⋮ | |
| | L* | a* | b* | H | Y | M | C | K | H | |
| CW1 | L*11 | a*11 | b*11 | 0 | Y11 | M11 | C11 | K11 | 0 | 3532 |
| USABLE COLOR GAMUT | L*21 | a*21 | b*21 | 0 | Y21 | M21 | C21 | K21 | 0 | TABLE 1 |
| | L*31 | a*31 | b*31 | 0 | Y31 | M31 | C31 | K31 | 0 | |
| CW2 | ⋮ | ⋮ | ⋮ | ⋮ | ⋮ | ⋮ | ⋮ | ⋮ | ⋮ | |

COLOR CONVERSION COEFFICIENT TABLE

IMAGE FORMATION APPARATUS AND IMAGE FORMATION METHOD

BACKGROUND OF THE INVENTION

1. Field of the Invention

The present invention relates to an image formation apparatus such as printer and copier and an image formation method for forming a three dimensional (3D) image by applying an electrophotograph method or an electrostatic recording method and using foaming toner. More specifically, the present invention relates to an image formation apparatus and an image formation method which have a color conversion function to realize identical coloration of image formed with an ordinary color image formation method and a 3D image formation method that forms color image on foaming toner.

2. Description of Related Arts

Typically, conventional image formation apparatuses such as printers and copiers using an electrophotograph method or an electrostatic recording method have been formed a monochrome or full-color image such as character, graphic image and photograph on a plane recording medium such as recording paper, to allow the image formed on the recording medium to be visually recognized for the transmission of desired data.

If, on the other hand, image data could be represented three dimensionally, reality for the image is enhanced, in addition to the possibility to use additional sense-tactile-.

As techniques of three dimensionally printing an image such as Braille characters and topographical maps by electrophotograph method, the techniques disclosed in Japanese Patent Laid Open No. 2000-131875 and Japanese Patent Laid-Open No. 2001-134006 are known.

These publications describe image formation methods in which 3D images are formed during, for example, electrophotograph recording process by placing a toner image containing color materials of predetermined colors on a foaming toner image, foaming the foaming toner image by the heat generated in fixation process, and melting and adhering the toner image of each color on the forming toner-made image.

On the other hand, in an ordinary color image formation, toner of predetermined colors is placed on a recording medium, the toner is melt and adhered onto the recording medium directly according to the image data and fixing a mixture of color toners of multiple colors as a color image.

Figure 10A:
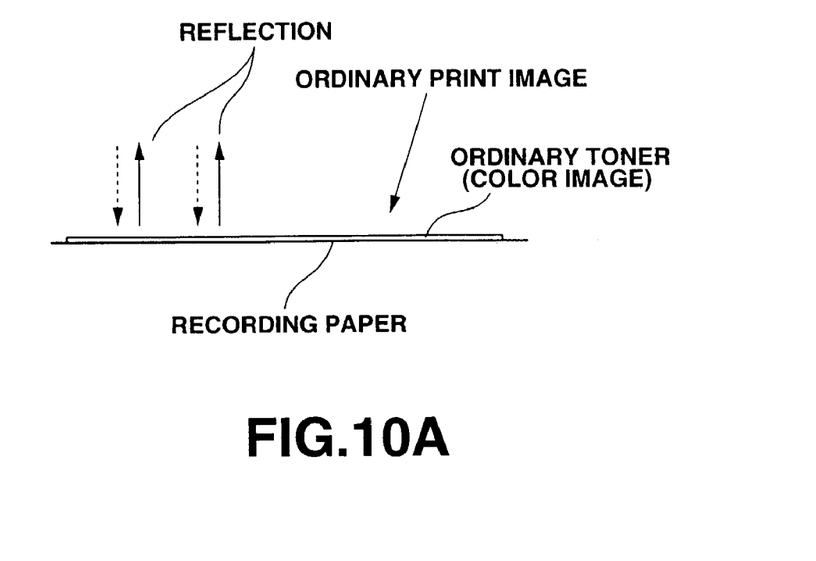
FIGS. 10A and 10B illustrate schematic sectional views for the comparison a conventional ordinary print image and a conventional 3D print image.
Figure 10B:
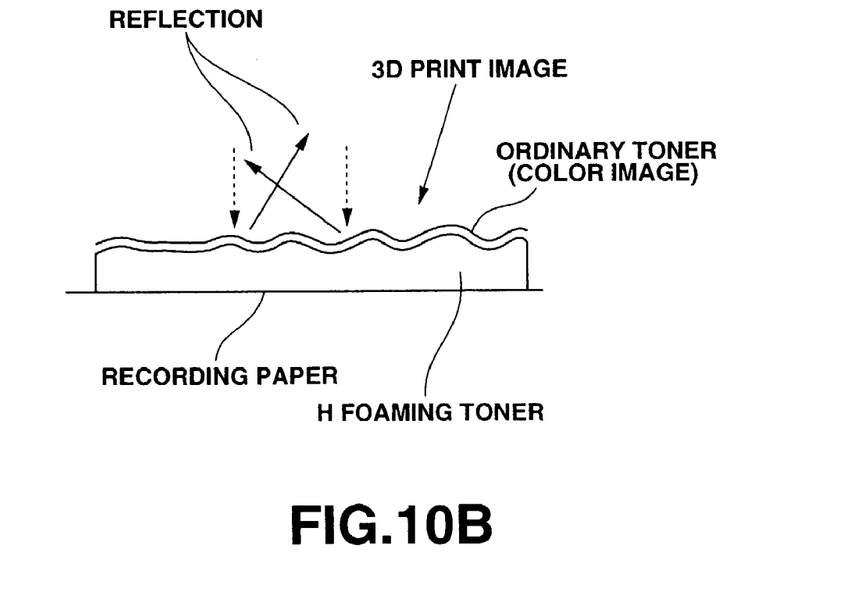

FIGS. 10A and 10B are schematic sectional views, respectively, illustrating a color image (ordinary print image) formed on a recording medium by an ordinary image formation method, and a 3D color image (3D print image) formed on recording medium by fixing toners of each color on a foaming toner, using a conventional image formation apparatus.

The ordinary print image shown in FIG. 10A is fixed on a plane recording paper and thus generates less scattered reflection (shown by the arrow of solid line) while the 3D print image shown in FIG. 10B tends to generate an increased diffusion of reflection (shown by the arrow of solid line) due to convexo-concave portions of a color image made of ordinary toners that is formed by foaming the foaming toners on the recording paper.

The above difference has caused a problem in which even the ordinary print image and the 3D print image have been created with the same color data, they produce visually-different coloration, thereby causing deteriorated image quality of a resulted print.

SUMMARY OF THE INVENTION

The present invention has been made in view of the above circumstances and to provide image formation apparatus and image forming method in which a preferable quality of a printed image having a constant coloration is realized on a recording media regardless of an ordinary print image where no foaming toner is placed and a 3D image where foaming toner is placed.

One aspect of the present invention provides an image formation apparatus for forming a 3D print image on a recording medium by an image of 3D printing material and an image of color material in accordance with image data, comprising a designation unit for designating a 3D print region using 3D printing material and a non-3D print region, with regard to the image data; and an image processing unit for performing different color conversions on the image data depending on the 3D print region and the non-3D print region designated by the designation unit.

Another aspect of the present invention provides an image formation method for forming a 3D print image on a recording medium by an image of 3D printing material and an image of color material in accordance with image data, comprising the steps of designating a 3D print region using 3D printing material and a non-3D print region with regard to the image data; and performing different color conversions on the image data depending on the 3D print region and the non-3D print region.

According to the present invention, image data is subjected to different color conversions depending on the 3D print region and the ordinary print region. Thus, each piece of image data is separately subjected to a color conversion so that the 3D print region and the ordinary print region have the same coloration. This allows the ordinary print image having thereon no foaming toner and the 3D print image having thereon the foaming toner to have the same coloration, thereby providing a preferable quality of a printed image.

BRIEF DESCRIPTION OF THE DRAWINGS

Preferable embodiments of the present invention will be described in detail based on the following drawings, wherein.

DESCRIPTION OF THE EMBODIMENTS

Embodiments of the present invention will be described in detail with reference to the accompanying drawings.

Figure 1:
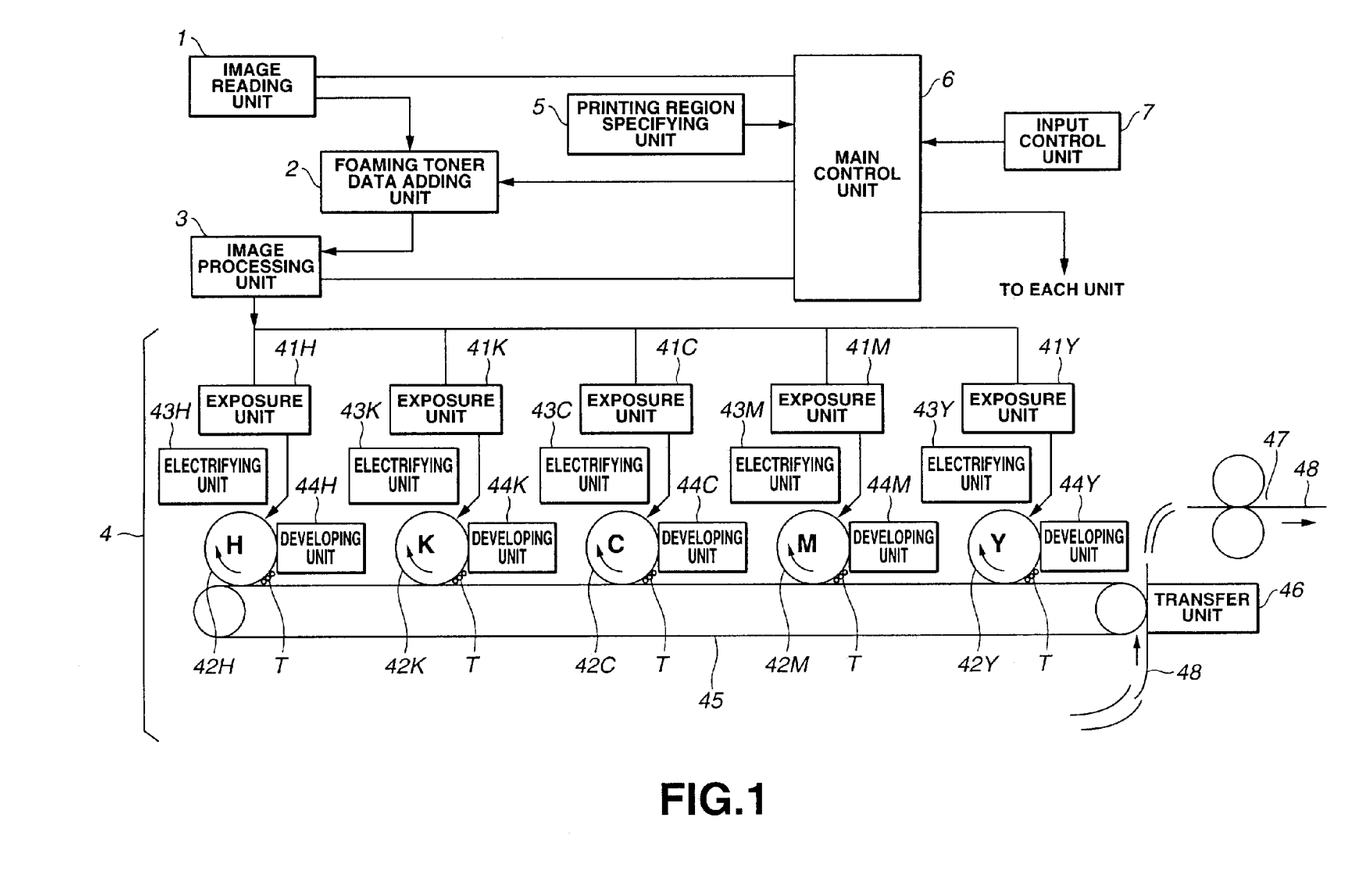
FIG. 1 is a block diagram illustrating main components of an image formation apparatus according to one embodiment of the present invention.

FIG. 1 is a block diagram illustrating main components of an image formation apparatus according to the present invention.

This image formation apparatus is used as a copier, for example. The image formation apparatus includes an image reading unit 1 for reading an image on an original paper; a foaming toner data adding unit 2 for adding foaming toner data to pixels within a 3D print region in the image data read by the image reading unit 1; an image processing unit 3 for performing different color processing to the image data to which the foaming toner data have been added with regard to the 3D print regions and ordinary print regions (i.e., non-3D print region); an image formation unit 4 for printing an ordinary print image and a 3D print image in accordance with the image data generated by the image processing by the image processing unit 3; a printing region designating unit 5 for designating the 3D print region and the ordinary print region; a main control unit 6 for controlling the entirety of the image formation apparatus; and an input manipulation unit 7 for performing input operations for commands related to a copy operation or other operations.

The image reading unit 1 illuminates with a light source an original paper provided on a platen glass to allow a reflection image of the original paper to be subjected through a reduction optical system to a scanning by an image reading device such as CCDs, thereby allowing this image reading device to read out the color material reflection image of the original paper with a predetermined dot density (e.g., 16 dot/mm).

The color material reflection image of the original paper which has been read by the image reading unit 1 is sent to the image processing unit 3 as original paper reflectivity data which is composed of three colors of red (R), green (G), and blue (B) (each of which is 8 bits), for example.

Then, the foaming toner data adding unit 2 adds the foaming toner data to the original paper reflectivity data with regard to pixels in the 3D print region among those in the ordinary print region and the 3D print region designated by the printing region designating unit 5.

The foaming toner data is set to "0" (zero) when the foaming toner is not used and is set to a discrete value of 8 bits by using a desired number of levels when the foaming toner is used. Alternatively, the foaming toner data may also be flag data which is set to "1" when the foaming toner is used and which is set to "0" (zero) when the foaming toner is not used.

The image processing unit 3 acquires the original paper reflectivity data sent from the foaming toner data adding unit 2 to subject the original paper reflectivity data to predetermined image processing such as shading correction, dislocation correction, L*a*b* color space conversion, gamma correction, de-framing and color/movement editing, thereby generating an original paper color gradation data including four colors of yellow (Y), magenta (M), cyan (C) and black (K) (each having 8 bits), and foaming toner gradation data (i.e., foaming toner amount data).

The image processing unit 3 also checks, as described later, whether the foaming toner data is added to the original paper reflectivity data for each noted pixel, and performs different color conversion processing on the pixel depending on whether the foaming toner data is added or not (i.e., depending on whether the pixel is included in the 3D print region or in the ordinary print region). Then, the image processing unit 3 subjects this image data which has experienced the color conversion to another processing such as gradation correction, and transmit this data to the image formation unit 4.

The image formation unit 4 is capable of forming the image of toners (i.e., ordinary toner which is not a foaming toner) having four colors of yellow (Y), magenta (M), cyan (C) and black (K) and the image of the foaming toner (H), and comprises exposure units 41Y, 41M, 41C, 41K and 41H which perform image exposure by a laser beam corresponding to each of the above toners and foaming toners; photosensitive drums 42Y, 42N, 42C, 42K and 42H having a role as an image carrier on which an electrostatic latent image is formed; electrifying units 43Y, 43M, 43C, 43K and 43H which electrifies the photosensitive drums (42Y, 42M, 42C, 42K, and 42H) before the electrostatic latent image is formed; and developing units 44Y, 44M, 44C, 44K and 44H which develop the electrostatic latent image formed on the photosensitive drums (42Y, 42M, 42C, 42K and 42H) to form plural toner images having different colors and a foaming toner image.

The image formation unit 4 further comprises an intermediate transfer belt 45 which performs multiple transfers (first bias transfer) on the four colors of toner images and the foaming toner image developed by the developing units 44Y, 44M, 44C, 44K and 44H; a transfer unit 46 which transfers (second bias transfer) the toner images which have been subjected to the multiple transfers by the intermediate transfer belt 45 to the recording paper 48; and a fixing unit 47 which fixes the toner image transferred from the transfer unit 46 to the recording paper 48.

The four colors of original paper color gradation data (yellow (Y), magenta (M), cyan (C) and black (K) (each consisting of 8 bits) and the foaming toner gradation data generated by the image processing by the image processing unit 3 are sent to corresponding exposure units 41Y, 41M, 41C, 41K and 41H in the image formation unit 4, respectively.

The exposure units 41Y, 41M, 41C, 41K and 41H expose an image to laser light according to the corresponding original paper color gradation data and the foaming toner gradation data, respectively.

Specifically, the exposure units 41Y, 41M, 41C, 41K and 41H modulate a semiconductor laser (not shown) according to gradation data of each of the colors (including H) to allow this semiconductor laser to emit a laser light LB according to the gradation data. This laser light LB emitted from the semiconductor laser is subjected to the deflection scanning by a rotational polygonal mirror (not shown), thereby being scanned and exposed, via a f·θ lens (not shown) and a reflection mirror (not shown), on the photosensitive drums 42Y, 42M, 42C, 42K and 42H functioning as an image carrier.

The photosensitive drums 42Y, 42M, 42C, 42K and 42H on which the laser light LB is scanned by the exposure units 41Y, 41M, 41C, 41K, and 41H are configured to be rotationally driven by a driving unit (not shown) in the direction shown by the arrows with a predetermined speed.

The photosensitive drums 42Y, 42M, 42C, 42K, and 42H have on the surface thereof an electrostatic latent image as follows. First, the surfaces of the photosensitive drums 42Y, 42M, 42C, 42K, and 42H are electrified by scorotrons (i.e., electrifying units) 43Y, 43M, 43C, 43K, and 43H for primary electrification to have predetermined polarity (e.g., negative polarity) and potential. Then, the surfaces are scanned and exposed to the laser light LB according to a color gradation data for reproducing an original paper, thereby providing the electrostatic latent image.

The surfaces of the photosensitive drums 42Y, 42M, 42C, 42K, and 42H are uniformly electrified to be −650 V, for example. Then, the image part is scanned and exposed to the laser light LB, thereby allowing an exposure part of the image part of −200 V to have an electrostatic latent image.

The electrostatic latent images formed on the photosensitive drums 42Y, 42M, 42C, 42K and 42H are subjected to a reversal development by the four colors of developing units 44Y, 44M, 44C and 44K (yellow (Y), magenta (M), cyan (C), black (K)) and the developing unit 44H for the foaming toner. In the reversal development, the electrostatic latent images are developed by a toner (electrification color material) which has been electrified to have the same negative polarity as the electrification polarity of the photosensitive drums 42Y, 42M, 42C, 42K and 42H, for example, thereby being toner images T of predetermined colors (including the foaming toner).

In the reversal development, a development roll of each of the developing units 44Y, 44M, 44C, 44K and 44H is applied with −500 V of a bias voltage for the development, for example. It is noted that the toner image T formed on each of the photosensitive drums 42Y, 42M, 42C, 42K and 42H is optionally electrified by a pretransfer electrifying unit (not shown) to have a negative polarity, thereby having an adjusted amount of charging.

The toner images T having the above colors (including H) formed on the photosensitive drums 42Y, 42M, 42C, 42K and 42H are transferred in a multiple manner to the intermediate transfer belt 45 provided at the lower part of the photosensitive drums 42Y, 42M, 42C, 42K and 42H.

This intermediate transfer belt 45 is supported such that the intermediate transfer belt 45 can be rotated by a predetermined driving unit with the same rotation speed as that of the photosensitive drums 42Y, 42M, 42C, 42K and 42H in the direction shown by the arrows.

On the intermediate transfer belt 45, there is sequentially transferred, in accordance with the colors of an image to be formed, a part or the entirety of the toner images T formed on the photosensitive drums 42Y, 42M, 42C, 42K and 42H having four colors of yellow (Y), magenta (M), cyan (C), and black (K); and the foaming toner image T which has been formed on the photosensitive drum 42H in accordance with a foaming toner signal for forming a 3D image. The former and the latter are transferred in a superposed manner.

Then, the toner images T transferred on the intermediate transfer belt 45 is transferred by a pressure and an electrostatic absorption by the transfer unit 46 to a recording paper 48 which has been carried with a predetermined timing.

The recording paper 48 has a predetermined size and is provided by a feed roll from the feeder cassettes (not shown) working as a plurality of recording medium storage members provided in the body of the copier. Then, the recording paper 48 is carried to the second bias transfer position (i.e., transfer unit 46) of the intermediate transfer belt 45 by a plurality of carrying rolls and resist rolls (not shown) with a predetermined timing.

Thereafter, the predetermined colors of toner images T from the intermediate transfer belt 45 are simultaneously transferred by the transfer unit 46 to the surface of the recording paper 48.

Then, the recording paper 48 on which the predetermined colors of toner images T from the intermediate transfer belt 45 are transferred is separated from the intermediate transfer belt 45 and then carried to the fixing unit 47. This fixing unit 47 has a heating roll and a pressurization roll which fix the toner images T on the recording paper 48 by applying a heat and a pressure thereto. Then, the recording paper 48 is discharged from the body of the copier, whereby the step for forming a color image is finished.

It is noted that the image formation unit 4 further includes a developing unit 44H for the foaming toner which stores white foaming toner including foaming material, in addition to the developing units 44Y, 44M, 44C and 44K which store four colors of toners (yellow (Y), magenta (M), cyan (C) and black (K)), respectively.

In the above-described development step, this developing unit 44H develops the last toner image among those transferred to the intermediate transfer belt 45 in a multiple manner (i.e., the foaming toner image transferred to the top layer of the images on the intermediate transfer belt 45).

In other words, when the toner images which have been transferred in a multiple manner on the intermediate transfer belt 45 are transferred on the recording paper 48, the multiple transferred toner images are layered on the recording paper 48 in an order opposite to the order of transferring the toner images on the intermediate transfer belt 45 (i.e., the foaming toner images are transferred on the bottom layer).

Thereafter, the toner images which have been multiple transferred on the recording paper 48 are fixed by the fixing unit 47. The fixing unit 47 applies a heat for fixation to the toner images so that the foaming toner in the bottom layer of the image is foamed. Then, the foaming toner which has been foamed to have a three dimensional shape has multiple transferred color toner images which are fixed as color images corresponding to a number of required colors of toners. As a result, a 3D color image is formed on the recording paper 48 on which the color image is fixed on the foaming toner that has been foamed.

FIGS. 2A to 2G illustrate transfer and fixation processes of a toner image by the image formation apparatus according to the present invention by showing the cross-sectional configuration thereof.

Figure 2A:
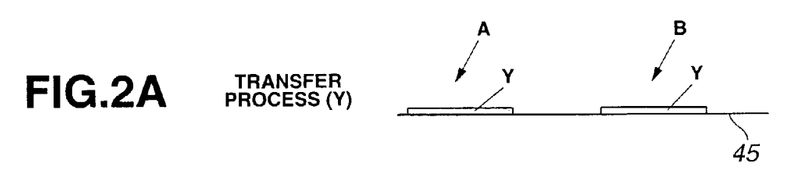
FIGS. 2A to 2G illustrate schematic sectional views illustrating a toner image to explain transfer and fixation processes.
Figure 2B:
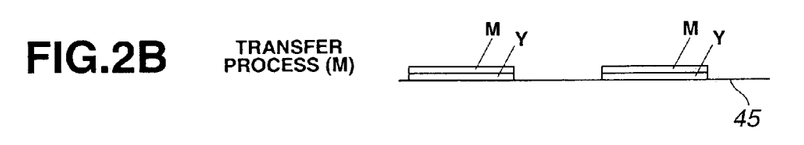
Figure 2C:
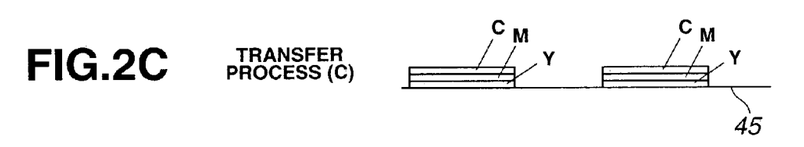
Figure 2D:
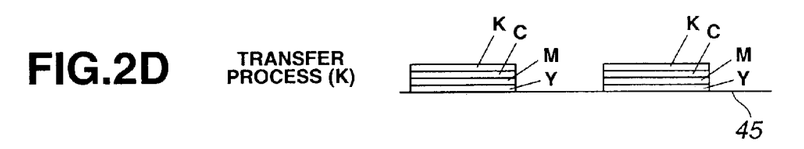
Figure 2E:
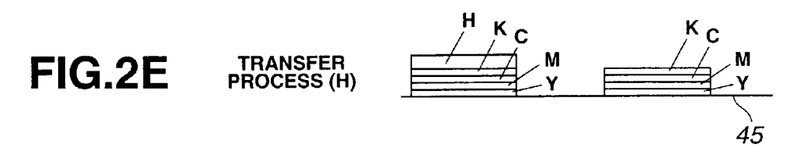
Figure 2F:
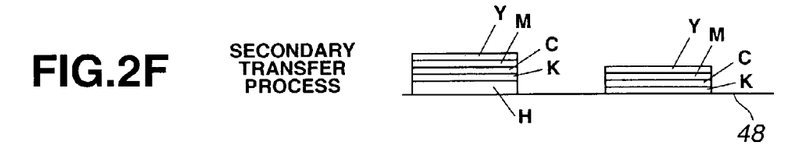
Figure 2G:
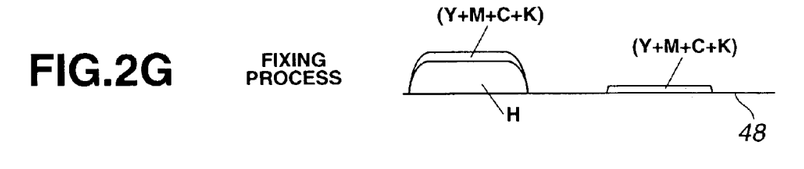

In these drawings, FIGS. 2A–2E illustrate the first bias transfer process, FIG. 2F illustrates the second bias transfer process and FIG. 2G illustrates the fixation process. The "A" and "B" shown in FIGS. 2A to 2G show a pixel, respectively.

In FIGS. 2A to 2G, the pixel A is a pixel in a 3D print region. This pixel A is formed as a part of a 3D color image by the following processes. Namely, the first bias transfer process (FIGS. 2A-2E) allows the toner images (Y, M, C, K, and H) to be sequentially transferred on the intermediate transfer belt 45 in a multiple manner. Then, the second bias transfer process (FIG. 2F) allows the multiple transferred toner layers to be reversed and to be transferred on the recording paper 48. Thereafter, the fixation process (FIG. 2G) allows the foaming toner (H) of the bottom layer of the images to be foamed, whereby each color of the toners is melted and fixed as a 3D color image on the foamed foaming toner (H).

The pixel B is a pixel in an ordinary print region. This pixel B is formed as a part of an ordinary color image by the following processes. Namely, the first bias transfer process (FIGS. 2A to 2E) allows the toner images (Y, M, C and K)

to be sequentially multiple transferred on the intermediate transfer belt 45. Then, the second bias transfer process (FIG. 2F) allows the multiple transferred toner layers to be transferred on the recording paper 48 in a reversed manner. Thereafter, the fixation process (FIG. 2G) allows the multiple transferred toners to be melt and fixed, whereby an ordinary color image is formed.

The image formation apparatus according to the present invention has a basic function of printing an ordinary print image and a 3D print image on the recording paper 48, based on the processes described with reference to FIGS. 1 and 2. In these processes, the image processing unit 3 performs different color conversions on an image data depending on a 3D print region and an ordinary print region designated by the printing region designating unit 5.

For example, assume a case in FIG. 2 where the pixel B is provided within an ordinary print region for directly forming a color image on the recording paper 48, and the pixel A is provided within a 3D print region for forming a color image on the foaming toner. In this case, the image formation apparatus according to the present invention performs color conversion on the image data corresponding to the pixels A and B in which the amount of color conversion is changed according to the amount of foaming toner.

In this way, the image formation apparatus according to the present invention provides an image processing function in which data of an image to be printed is subjected to different color conversions depending on an ordinary print region and a 3D print region. This function will be described below.

Figure 3:
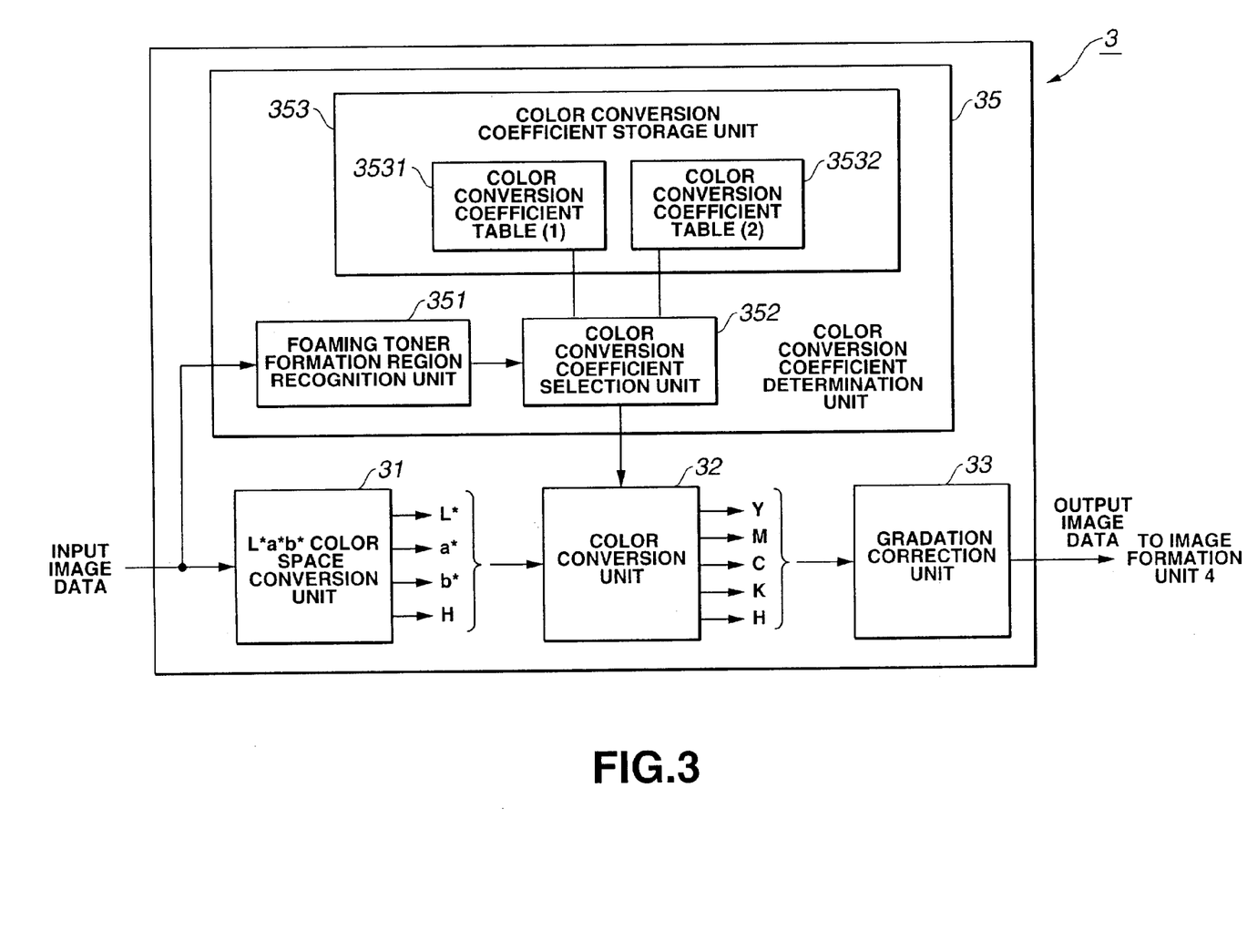
FIG. 3 is a block diagram illustrating the configuration of an image processing unit according to the first embodiment of the present invention.

FIG. 3 is a block diagram illustrating the configuration of the image processing unit 3 of the image formation apparatus according to the first embodiment of the present invention.

This image processing unit 3 comprises a L*a*b* color space conversion unit 31; a color conversion unit 32; a gradation correction unit 33; and a color conversion coefficient determination unit 35.

The color conversion coefficient determination unit 35 comprises a foaming toner formation region recognition unit 351; a color conversion coefficient selection unit 352; and a color conversion coefficient storage unit 353.

The color conversion coefficient storage unit 353 stores a color conversion coefficient table 3531 for storing color conversion coefficients used for the color conversion of image data with regard to a 3D print region and a color conversion coefficient table 3532 for storing color conversion coefficients used for the color conversion of image data with regard to an ordinary print region. Hereinafter, the color conversion coefficient tables 3531 and 3532 will be abbreviated as tables 1 and 2, respectively.

Figure 4A:
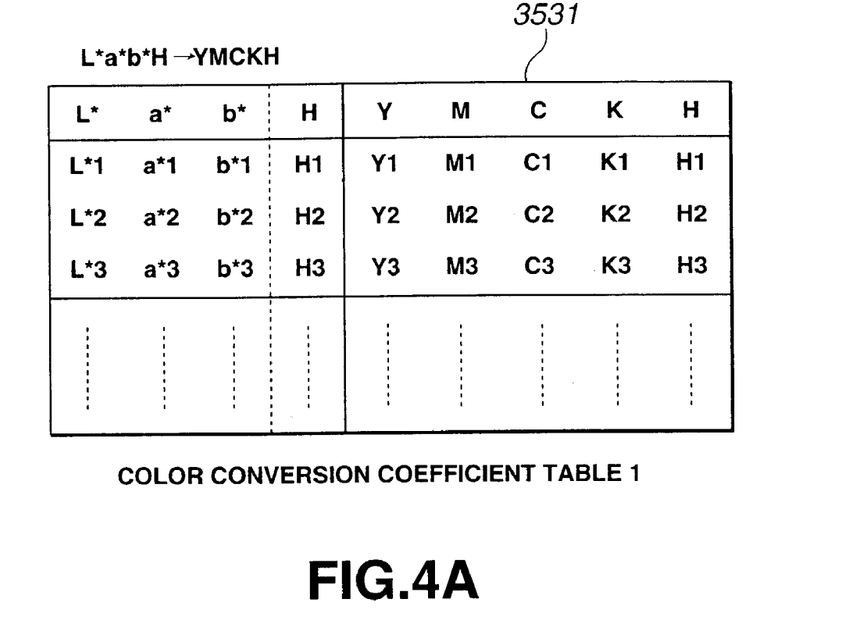
FIGS. 4A and 4B illustrate color conversion coefficient tables 1 and 2 in the image processing unit.
Figure 4B:
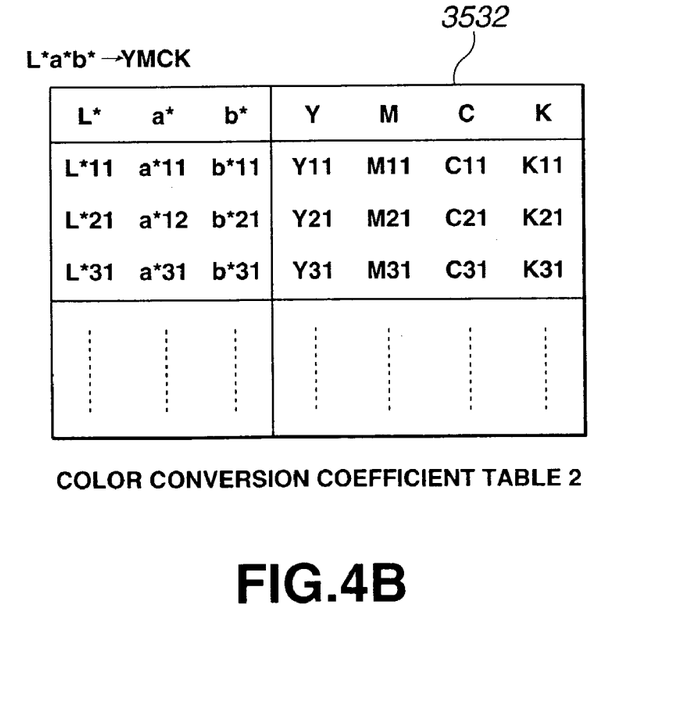

FIG. 4A shows an example of the table 1, and FIG. 4B shows an example of the table 2.

As shown in FIG. 4A, the table 1 stores the color conversion coefficients for generating YMCKH signals out of L*a*b*H signals.

Specifically, the table 1 provides the correspondence between L*a*b*H and YMCKH. More specifically, the table 1 in FIG. 4A shows the correspondence between L*a*b*H values shown in the left columns and YMCKH values shown in the right column. The color conversion coefficients of YMCKH (color conversion coefficients: coloration data) corresponding to L*a*b*H values are used for the color conversion by the color conversion unit 32 to provide a desired coloration of a 3D color image to be formed.

Among the L*a*b*H values shown in the table 1, the value of "H" is the value of the data of 8 bits representing the amount of the foaming toner. In other words, this table 1 uses a parameter of the amount of foaming toner (H) for determining the YMCKH values out of the L*a*b*H values.

The table 2 as shown in FIG. 4B on the other hand stores the color conversion coefficients for generating YMCK signals out of L*a*b* signals.

The table 2 provides the correspondence between L*a*b* and YMCK (color conversion coefficients: coloration data). When L*a*b* has a value shown in the left column of the table 2, if the color conversion unit performs color conversion by using the color conversion coefficient of the value, YMCK, in the corresponding right column, a desired coloration can be obtained with regard to the ordinary color image formed at that time.

The table 1 can be previously prepared in accordance with the following procedure.

First, by using the image processing apparatus, the foaming toner amount H has been changed beforehand by several levels (e.g., by three to nine levels) to output a set of CMYK signals to the image formation unit 4, thereby outputting a patch (i.e., test print).

Next, a device performance transmission model for associating the CMYK+H value with the L*a*b* value is prepared by measuring the color of the outputted patch. This model may be prepared by several algorithms (e.g., neural network or multiple regression model) and any of them may be used in the present invention.

Then, DLUT (a three dimensional color correction LUT) indicating the relation between the L*a*b*H value and the CMYKH value is prepared. For the preparation of DLUT, the foaming toner amount H as specified is used and UCR (ink production/under color removal) processing is used to calculate the value of "K" out of the L*a*b* value, thereby determining the CMY value based on this K value and the foaming toner amount H. In other words, an inverse mapping is performed while keeping the K value and the H value of the device performance transmission model obtained by the above-mentioned color measurement of the patch.

When the amount of the foaming toner does not meet the previously-prepared patch conditions, a linear interpolation is used to obtain other conditions.

The device performance transmission model prepared by the above procedure is used to obtain the relation between L*a*b*H and color conversion coefficients (YMCKH). This relation shows what L*a*b*H value allows what value of color conversion coefficient (YMCKH) to be used for the color conversion in order to obtain a desired coloration of a 3D color image by the foaming toner amount H. This relation is stored in the table 1.

A similar procedure (however, without using the parameter of the foaming toner amount H) is also used to allow the table 2 to store the data of the relation between L*a*b* and color conversion coefficient (YMCK) showing what L*a*b* value allows what value of color conversion coefficient (YMCK) to be used for the color conversion in order to obtain a desired coloration of an ordinary color image.

In the copying operation after the contents of the tables 1 and 2 are incorporated into the image processing unit 3, the L*a*b* color space conversion unit 31 and the foaming toner formation region recognition unit 351 of the image processing unit 3 are inputted with the image data. This image data is obtained by adding the data regarding the three colors of original paper reflectivity (which are red (R), green (G) and blue and each of which is 8 bits) which have been read by the image reading unit 1 to the foaming toner data by the foaming toner data adding unit 2 according to a 3D printing designation from the printing region designating unit 5.

The L*a*b* color space conversion unit 31 performs a L*a*b* color space processing based on the above input image data to generate a L*a*b*H signal, thereby inputting the L*a*b*H signal to the color conversion unit 32. It is noted that the H signal inputted to the L*a*b* color space conversion unit 31 is outputted therefrom without being subjected to any processing.

The foaming toner formation region recognition unit 351 in the color conversion coefficient determination unit 35 on the other hand refers to the foaming toner data included in the above input image data to recognize whether or not a pixel to be printed is the one within a 3D print region (i.e., a region in which foaming toner is used) or the one within an ordinary print region.

In accordance with the result showing whether or not the pixel to be printed is the one within a 3D print region or the one within an ordinary print region, the foaming toner formation region recognition unit 351 sends a 3D printing designation signal or an ordinary printing designation signal to the color conversion coefficient selection unit 352.

When a 3D printing designation signal is inputted to the color conversion coefficient selection unit 352 from the foaming toner formation region recognition unit 351, then the color conversion coefficient selection unit 352 selects the table 1 in the color conversion coefficient storage unit 353, thereby storing the table 1 into the color conversion unit 32.

The color conversion unit 32 subjects the L*a*b*H signal inputted from the L*a*b* color space conversion unit 31 to a color conversion by using the table 1 sent from the color conversion coefficient selection unit 352.

Specifically, the color conversion unit 32 uses the value of "H" (i.e., foaming toner amount) in the inputted L*a*b*H signal as a key for searching the table 1 to read out a color conversion coefficient (YMCKH) corresponding to the value of "H", thereby performing the color conversion by the calculation (e.g., multiplication) of the color conversion coefficient and the YMCKH signal generated out of the inputted L*a*b*H signal.

When an ordinary printing designation signal is inputted to the color conversion coefficient selection unit 352 from the foaming toner formation region recognition unit 351, then the color conversion coefficient selection unit 352 selects the table 2 in the color conversion coefficient storage unit 353, thereby storing the table 2 into the color conversion unit 32.

The color conversion unit 32 subjects the L*a*b*H signal inputted from the L*a*b* color space conversion unit 31 to a color conversion by using the table 2 sent from the color conversion coefficient selection unit 352.

Specifically, the color conversion unit 32 uses the inputted L*a*b*H signal as a key for searching the table 1 to read out a color conversion coefficient (YMCKH (H=0)) corresponding to the value of the L*a*b*H signal, thereby performing the color conversion by the calculation (e.g., multiplication) of the color conversion coefficient and the YMCKH signal generated out of the inputted L*a*b*H signal.

The signals (Y, M, C, K and H) which have been subjected to the color conversion by the color conversion unit 32 are then subjected to the gradation correction by the gradation correction unit 32, thereby being transmitted to the image formation unit 4.

Then, the image formation unit 4 forms an ordinary print image and a 3D print image as follows. Based on the image data which have been subjected to the color conversion (Y, M, C, K and H of gradation data) and which has been inputted by the image processing unit 3 and with the above-described method, the image formation unit 4 transfers on the recording paper 48 a toner image of an ordinary printing toner and a toner image of foaming toner and then apply heat to the ordinary toner image and the foaming toner image transferred on the recording paper 48 to fix the images for the formation.

In the above-described manner, according to the first embodiment, there is provided a coloration data table (i.e., the table 1) that has stored beforehand the coloration characteristics (i.e., chromaticity data) of an ordinary toner (i.e., color material) and secondary and third color according to the amount H of the foaming toner (i.e., 3D printing material). The first embodiment uses the coloration data table as a base for separately performing color conversion on a 3D print region and an ordinary print region (i.e., non-3D print region) so that the 3D print region and the ordinary print region have an identical chromaticity.

Specifically, the table 1 stores color conversion coefficients as the chromaticity data for setting the coloration of the ordinary printing toner in accordance with the foaming toner amount H. Then, a color conversion coefficient is determined from the table 1 based on an image data, a 3D printing designation signal and foaming toner amount data. The determined color conversion coefficient is used for the color conversion.

In this case, the color conversion coefficient is a value which has been set to provide a desired coloration for the foaming toner amount H. Thus, a 3D print image formed on the recording paper 48 based on the image data obtained by the color conversion by using this color conversion coefficient also shows the desired coloration, thereby allowing the coloration of the color image on the foaming toner to be identical with the coloration of the ordinary print image having thereon no foaming and thus providing a desirable quality of the printed image.

It is noted that the image processing unit 3 shown in FIG. 3 are separately provided with the table 1 for storing color conversion coefficients for a 3D print image and the table 2 for storing color conversion coefficients for an ordinary print image. This separate provision of the tables 1 and 2 is for accommodating to a task requiring the color conversion of an ordinary print without using a 3D print.

Figure 8:
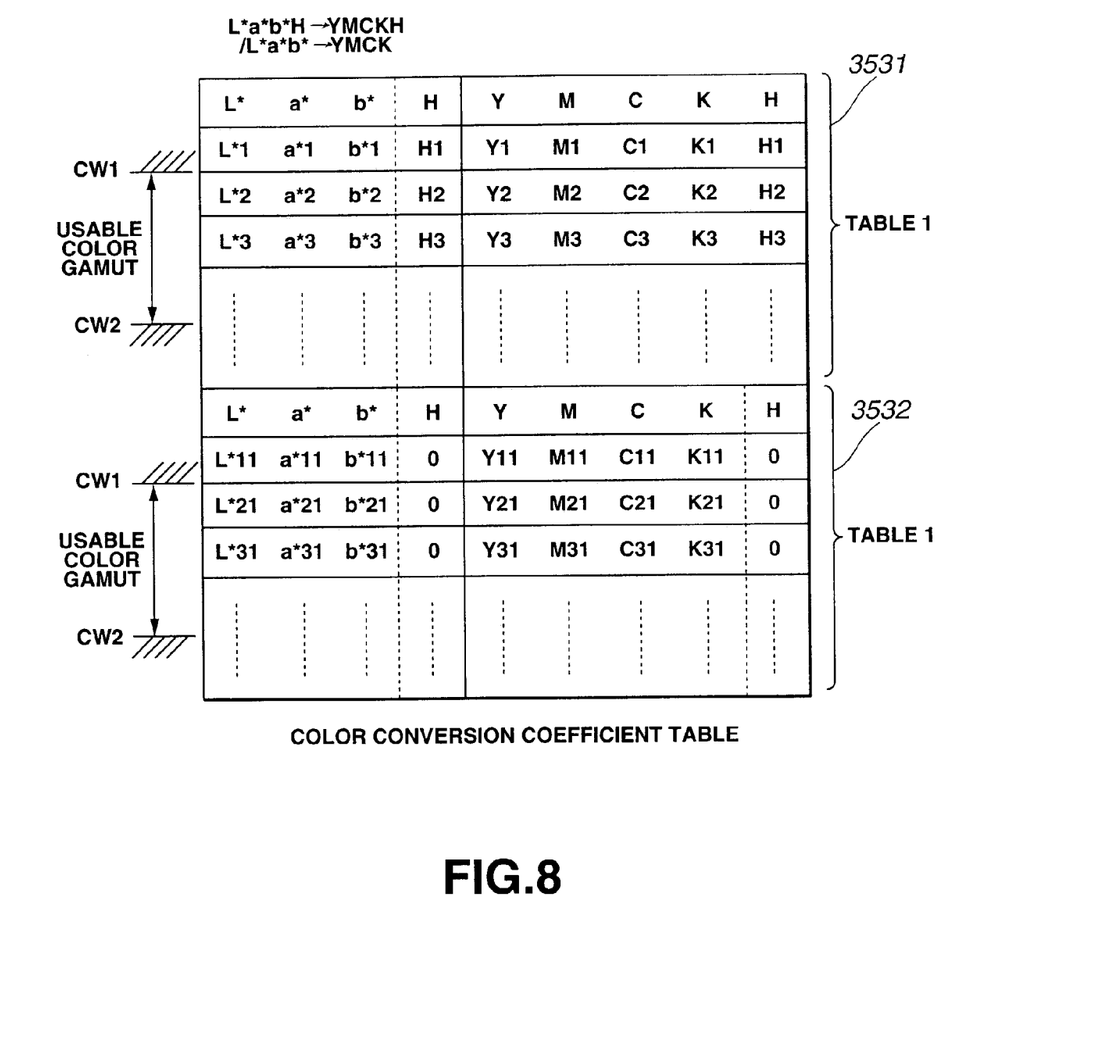
FIG. 8 shows a color conversion coefficient table of the image processing unit in the second embodiment.

In the case, the tables 1 and 2 may not be separately provided as shown in FIG. 3 and may be unified into one table (see FIG. 8). If the tables 1 and 2 are unified into one table, the foaming toner amount H of "0 (zero)" corresponds to an ordinary printing. The unified table can be prepared by using this fact.

It is also noted that the present embodiment uses the table 1 including the foaming toner amounts. However, each of the foaming toner amounts may be provided with a suitable table so that a table can be selected in accordance with the foaming toner amount H so long as the foaming toner amounts are previously specified.

As described above, the processing function of this embodiment performs different color conversions on the image data depending on the 3D print regions and the ordinary print regions. Thus, this processing function enables the following printing operations.

Figure 5:
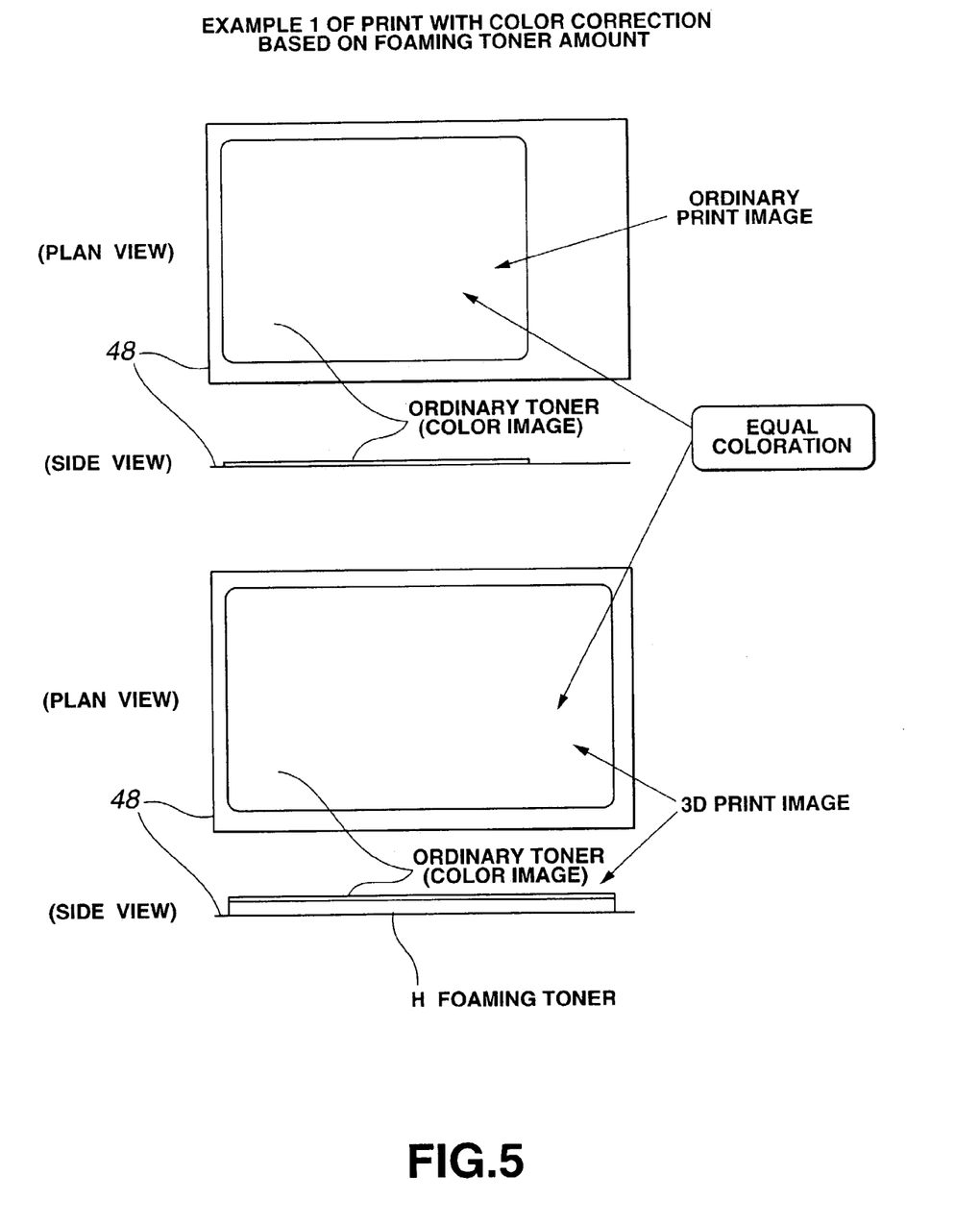
FIG. 5 shows an example of a resultant print obtained by the color conversion by the image processing unit in the first embodiment.

FIG. 5 illustrates an example of a resultant print based on the image data obtained by the color conversion by the image processing unit 3.

The upper diagram shown in FIG. 5 shows the plan view and the side view of the recording paper 48 on which an ordinary print image is formed. The lower diagram shown in FIG. 5 shows the plan view and the side view of the recording paper 48 on which a 3D print image is formed.

As can be seen from FIG. 5, comparison between the ordinary print image and the 3D print image which are printed on the recording paper 48 shows that the above-described color conversion processing in accordance with the foaming toner amount by the image processing unit 3 allows the coloration of the 3D print image having thereon the foaming toner H to be identical to that of the ordinary print image having thereon no foaming toner H.

This is possible by previously specifying color conversion coefficients used as color conversion coefficients for the color conversion in accordance with the foaming toner amount H so as to provide a desired coloration suitable for the foaming toner amount H.

Figure 6:
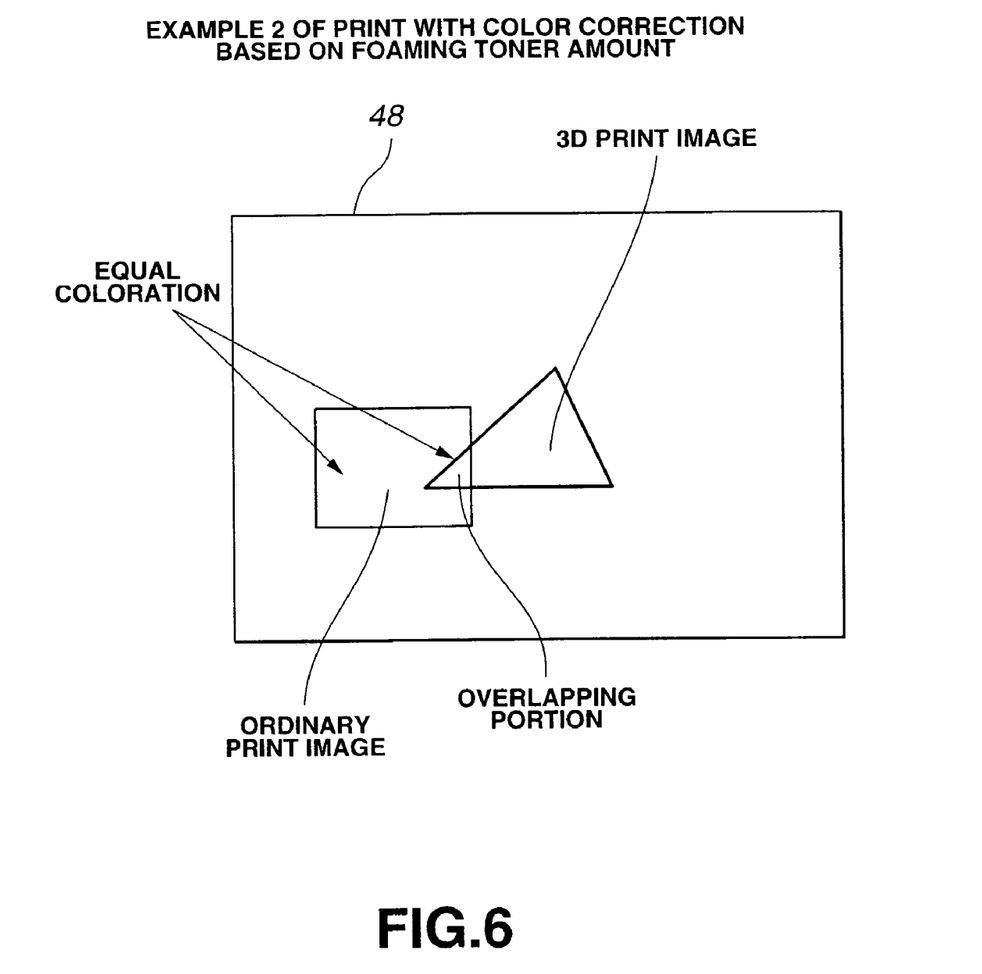
FIG. 6 shows another example of a resultant print obtained by the color conversion by the image processing unit in the first embodiment.

FIG. 6 shows another example of a resultant print based on the image data obtained by the color conversion by the image processing unit 3.

In this example, the recording paper 48 has thereon mixed formation of a 3D print image and an ordinary print image and the ordinary print image is partially overlapped with the 3D print image. FIG. 6 shows the coloration of the overlapping portion is identical to that of the ordinary print image other than the overlapping portion (i.e., plane part).

This is possible by that the color conversion in the overlapping portion is performed depending on the foaming toner amount H below the overlapping portion by the above-described color conversion processing by the image processing unit 3 in accordance with the foaming toner amount H. This color conversion is performed by using a color conversion coefficient which has been previously determined to provide a desired coloration in accordance with the foaming toner amount H.

Next, the second embodiment of the present invention will be described.

Figure 7:
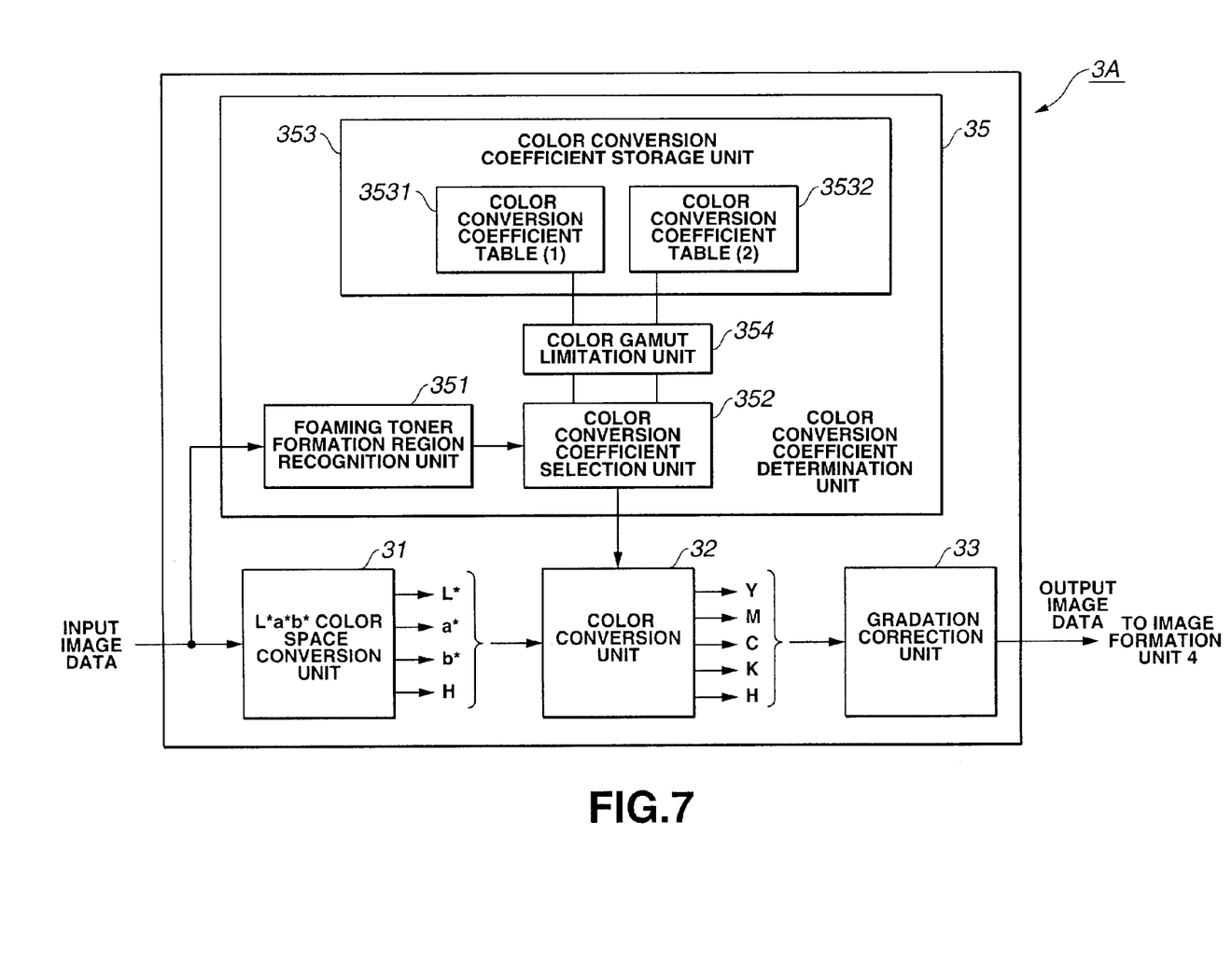
FIG. 7 is a block diagram illustrating the configuration of an image processing unit according to the second embodiment of the present invention.

FIG. 7 is a block diagram illustrating the configuration of an image processing unit 3A of the second embodiment in the image formation apparatus according to the present invention. In FIG. 7, those components of the image processing unit 3A of the second embodiment having the same functions as in the image processing unit 3 of the first embodiment (FIG. 3) are allotted with the same reference numerals as in the first embodiment.

This image processing unit 3A according to the second embodiment differs from the image processing unit 3 according to the first embodiment (FIG. 3) in that a color gamut limitation unit 354 is provided between the table 1 (color conversion coefficient table 3531) and the table 2 (color conversion coefficient table 3532) in the color conversion coefficient determination unit 35 and a color conversion coefficient setting unit 352.

This color gamut limitation unit 354 has a function of limiting color gamut which may use the color conversion coefficients stored in the tables 1 and 2 (i.e., a filter-like function).

This filter-like function by the color gamut limitation unit 354 will be described more specifically below. A case is considered where the tables 1 and 2 used in the image processing unit 3A according to the present embodiment are configured to be a single unified-type color conversion coefficient table as shown in FIG. 8, for example (however, the tables 1 and 2 may also be provided as separate ones). In this case, color gamut of usable color conversion coefficients in the table 1 are limited to color gamut from CW 1 to CW2 and, color gamut of usable color conversion coefficients in the table 2 are also limited to the color gamut from CW 1 to CW 2.

The color gamut is limited as follows. First, the image processing apparatus according to the present invention is used to previously change, as described in the procedure for obtaining the table 1 in the first embodiment, the foaming toner amount H by several levels (e.g., by three levels to nine levels) to output a set of CMYK signals to the image formation unit 4, thereby outputting a patch (test print).

Next, the color of the outputted patch is measured to prepare a device performance transmission model for associating the CMYK+H value with the L*a*b* value.

Thereafter, the color patch data prepared by the above procedure is used as a base for calculating color reproduction regions (color gamut) under the conditions of specified foaming toners. A condition among these conditions which provides the smallest color reproduction region is used as a base for determining a color reproduction region used for a 3D printing.

Then, how the mapping of the color reproduction regions is performed in accordance with the amount of foaming toner included in the image data is calculated. The mapping may be performed with known mapping techniques.

The color reproduction region used for printing an ordinary print may be determined so as to be the same color reproduction region used for a 3D printing determined by the above-described procedure.

Next, the operation of this image processing unit 3A will be described.

While the copy operation by the image processing apparatus is performed, the L*a*b* color space conversion unit 31 and the foaming toner formation region recognition unit 351 of the image processing unit 3 receive an image data (including foaming toner data) from the image reading unit 1. Then, the L*a*b* color space conversion unit 31 uses the received image data as a base for performing a L*a*b* color space processing to generate a L*a*b*H signal, thereby inputting the L*a*b*H signal to the color conversion unit 32. It is noted that the H signal (i.e., foaming toner amount signal) inputted to the L*a*b* color space conversion unit 31 is outputted therefrom without being subjected to any processing.

The foaming toner formation region recognition unit 351 in the color conversion coefficient determination unit 35 on the other hand refers to the foaming toner data included in the above inputted image data to recognize whether or not a pixel to be printed is the one within a 3D print region (i.e., a region in which foaming toner is used) or the one within an ordinary print region.

In accordance with the result showing whether or not the pixel to be printed is the one within a 3D print region or the one within an ordinary print region, the foaming toner formation region recognition unit 351 sends to the color conversion coefficient selection unit 352 a 3D printing designation signal or an ordinary printing designation signal.

When a 3D printing designation signal is inputted to the color conversion coefficient selection unit 352 from the foaming toner formation region recognition unit 351, then the color conversion coefficient selection unit 352 selects the table 1 in the color conversion coefficient storage unit 353, thereby storing the table 1 into the color conversion unit 32.

Then, the color gamut limitation unit 354 works to limit, in accordance with the above designation, the color gamut of the color conversion coefficients which may be used in the table 1 to the color gamut ranging from CW 1 to CW 2 (see FIG. 8), whereby only the color conversion coefficients of the color gamut from CW 1 to CW 2 are sent to the color conversion unit 32.

The color conversion unit 32 performs a color conversion on the L*a*b*H signal inputted from the L*a*b* color space conversion unit 31 by using the color conversion coefficients of the above color gamut ranging from CW 1 to CW 2 sent from the color conversion coefficient selection unit 352. This color conversion processing for printing a 3D print is performed in the same manner as in the first embodiment.

When an ordinary printing designation signal is inputted to the color conversion coefficient selection unit 352 from the foaming toner formation region recognition unit 351, then the color conversion coefficient selection unit 352 selects the table 2 in the color conversion coefficient storage unit 353, thereby storing the table 2 into the color conversion unit 32.

Then, the color gamut limitation unit 354 works to limit, in accordance with the above designation, the color gamut of the color conversion coefficients which may be used in the table 2 to the color gamut ranging from CW 1 to CW 2 (see FIG. 8), whereby only the color conversion coefficients of the color gamut from CW 1 to CW 2 are sent to the color conversion unit 32.

The color conversion unit 32 subjects the L*a*b*H signal inputted from the L*a*b* color space conversion unit 31 to a color conversion by using the color conversion coefficients of the above color gamut ranging from CW 1 to CW 2 sent from the color conversion coefficient selection unit 352. This color conversion processing for printing an ordinary print is also performed in the same manner as in the first embodiment.

Then, the signal (i.e., Y, M, C, K and H of gradation data) which has been subjected to a color conversion by the color conversion unit 32 is then subjected to a gradation correction by the gradation correction unit 32, and sent to the image formation unit 4.

The image formation unit 4 forms an ordinary print image and a 3D print image as follows. Based on the image data which have been subjected to the color conversion (i.e., Y, M, C, K and H of gradation data) and which has been inputted by the image processing unit 3, the image formation unit 4 transfers on the recording paper 48 a toner image of an ordinary printing toner and a toner image of foaming toner and then apply heat to the ordinary toner image and the foaming toner image transferred on the recording paper 48 to fix the images for the formation in the above-described manner.

In the printing operation by the image formation unit 4, the image processing unit 3A performs a color conversion on the image data of the 3D print region and the image data of the ordinary print region only with regard to the above-described color gamut ranging from CW 1 to CW 2, respectively.

Figure 9:
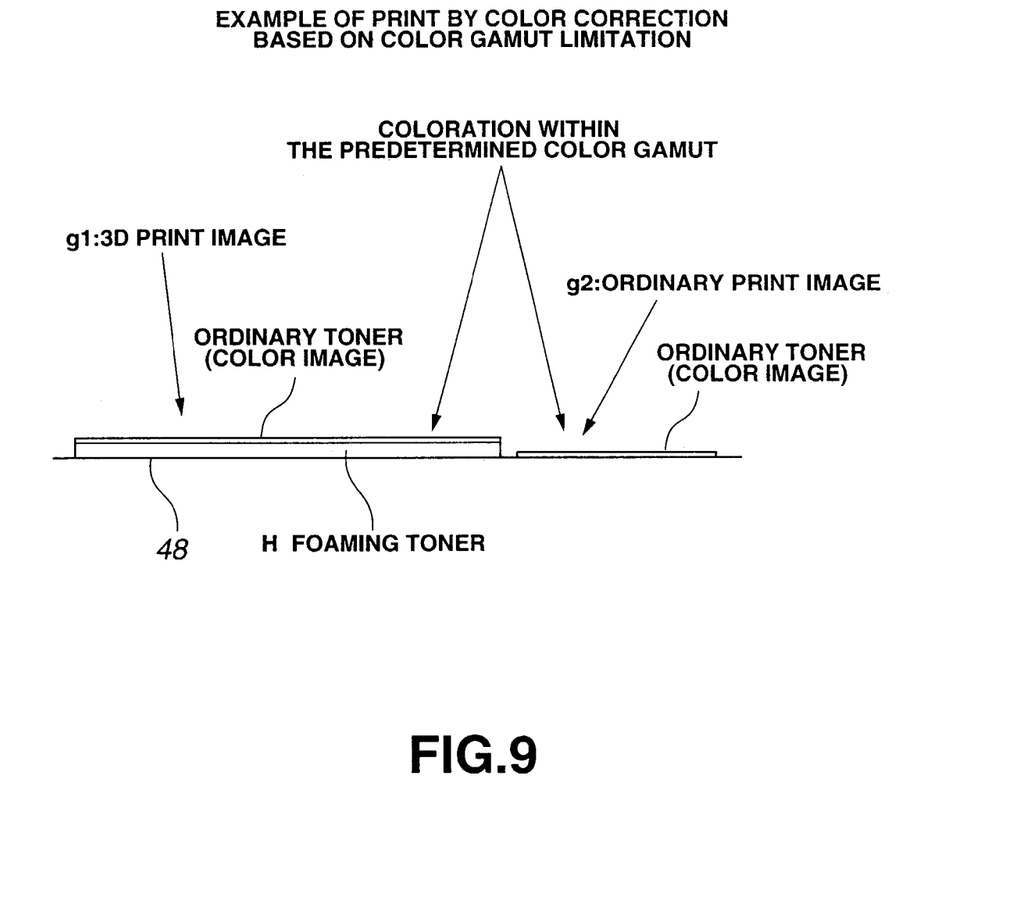
FIG. 9 shows an example of a resultant print obtained by the color conversion by the image processing unit according to the second embodiment.

FIG. 9 shows an example of a resultant print obtained by the color conversion by the image processing unit 3A in accordance with the second embodiment of the present invention.

In FIG. 9, a 3D print image g1 having thereon a foaming toner H and an ordinary print image g2 having thereon no foaming toner H are formed on the recording paper 48. The image data of the 3D print region and the ordinary print region are subjected to a color conversion processing only with regard to the same range of color gamut. As a result, both of the 3D print image g1 and the ordinary print image g2 formed on the recording paper 48 provided by the color-converted image data have the same coloration within the above range of color gamut.

In this way, the second embodiment uses the color gamut limitation unit 354 for limiting the usable color gamut (same color gamut) of color conversion coefficients for printing both of a 3D print and an ordinary print, whereby a 3D print region having thereon a foaming toner and an ordinary print region having thereon no foaming toner are subjected to a color conversion only with regard to the same range of color gamut.

Such a color conversion processing allows the 3D print image g1 and the ordinary print image g2 formed on the recording paper 48 (see FIG. 9) to be reproduced only with regard to the limited color gamut as described above. This allows the 3D print image g1 and the ordinary print image g2 to have less difference in the coloration, thereby providing a desirable quality of a printed image.

In the foregoing, the second embodiment has been described a case where the limited color gamut used for printing a 3D print are totally identical to those used for printing an ordinary print. However, another case may be considered where color reproduction regions used for printing an ordinary print are desired to be increased to a certain number. In such a case, an intermediate value between the limited color gamut for printing a 3D print and the limited color gamut for printing an ordinary print is used as the value of the limited color gamut for printing the ordinary print to perform the mapping processing for the color gamut. This allows to absorb the difference in printing conditions (i.e., coloration) between the 3D print image and the ordinary print image to a certain level, and also allows to secure the color reproducibility of the ordinary print image to the maximum level.

Such a function may be realized by providing user interface (UI) separately, through which a command from a user is sent to the main control unit 6, for example. This configuration allows to suitably change color gamut limited for printing a 3D print and an ordinary print.

Another processing function may be added by which a color reproduction region priority flag is provided to correct, the amount of foaming toner to a level lower than specified if it is desired to increase the color reproduction regions.

It is noted that the present invention is not limited to the above embodiments described with reference to the drawings and may be suitably modified without departing from the intention.

For example, the printing region designating unit 5 may be added with a function in which an user interface is used for allowing a user to designate a 3D print region or an ordinary print region.

Specifically, another configuration may be provided in which the input manipulation unit 7 of the image formation apparatus shown in FIG. 1 displays a region designation mode screen on the screen thereof (not shown). In this configuration, by selecting an attribute (e.g., image part, frame, or character part) of a region to be printed in a three dimensional manner, the data of the selected attribute is inputted to the foaming toner data adding unit 2.

In this configuration, the foaming toner data adding unit 2 may have a function to extract a region corresponding to the attribute from the original paper reflectivity data inputted from the image reading unit 1 and to apply the foaming toner data to the pixels in this region.

Still another configuration may be provided where the image formation apparatus includes an external interface, through which an image data is acquired from an external device such as an data processing terminal (e.g., personal computer) or a digital camera. With this configuration, an image including a 3D image by foaming is printed after the image has been subjected to the above-described image processing.

Especially for a case where an image data acquired from a personal computer is to be printed, a printing region designation function corresponding to the printing region designating unit 5 may be provided, for example, by a display screen of the personal computer displaying an image to be printed and by an input apparatus (e.g., keyboard or mouse) through which a region in the image to be printed in a three dimensional manner is designated.

In this case, the foaming toner data adding unit 2 may have a function to extract the pixels within a region designated as the above 3D print region from the image data inputted from the personal computer, thereby applying the foaming toner data to the pixels.

The embodiments have been described above by assuming the image formation apparatus according to the present invention as a copying machine. However, the image formation apparatus according to the present invention also may be configured as a printer or other like machines. In such a case, a printer has an interface function for acquiring an image data from an data processing terminal (e.g., personal computer) as a replacement for the image reading unit 1 in the image formation apparatus (copying machine) shown in FIG. 1.

What is claimed is:

1. An image formation apparatus for forming a three dimensional print image on a recording medium by an image of three dimensional printing material and an image of color material in accordance with image data, comprising:
    designation means for designating a three dimensional print region using three dimensional printing material and a non-three dimensional print region, with regard to the image data; and
    image processing means for performing different color conversions on the image data depending on the three dimensional print region and the non-three dimensional print region designated by the designation means.

2. An image formation apparatus according to claim 1, wherein the image processing means has a color conversion means for changing the color conversion according to the amount of three dimensional printing material transferred on the recording medium.

3. An image formation apparatus according to claim 2, wherein the color conversion means includes:
    a coloration data table for storing the coloration data of the color material according to amount of three dimensional printing material transferred on the recording medium; and
    color conversion means for using the coloration data table as a base for separately performing a color conversion on the image data depending on the three dimensional print region and the non-three dimensional print region so that the three dimensional print region and the non-three dimensional print region have identical coloration.

4. An image formation apparatus for forming a three dimensional print image on a recording medium by an image of three dimensional printing material and an image of color material in accordance with image data, comprising:
    designation means for designating a three dimensional print region using three dimensional printing material and a non-three dimensional print region, with regard to the image data; and
    image processing means for performing a color conversion on the image data so that the three dimensional print region and the non-three dimensional print region designated by the designation means have identical color gamut.

5. An image formation method for forming a three dimensional print image on a recording medium by an image of three dimensional printing material and an image of color material in accordance with image data, comprising the steps of:
    designating a three dimensional print region using three dimensional printing material and a non-three dimensional print region with regard to the image data; and
    performing different color conversions on the image data depending on the three dimensional print region and the non-three dimensional print region.

6. An image formation method according to claim 5, wherein amount of the color conversion is changed according to amount of three dimensional printing material transferred on the recording medium.

7. An image formation method according to claim 6, further comprising the steps of:
    preparing a coloration data table;
    storing coloration data of the color material in the coloration data table according to the amount of three dimensional printing material transferred on the recording medium; and
    performing separate color conversion on the image data depending on the three dimensional print region and the non-three dimensional print region so that the three dimensional print region and the non-three dimensional print region have the identical coloration.

8. An image formation method for forming a three dimensional print image on a recording medium by an image of three dimensional printing material and an image of color material in accordance with image data, comprising the steps of:
    designating a three dimensional print region using three dimensional printing material and a non-three dimensional print region with regard to the image data; and
    performing a color conversion on the image data so that the three dimensional print region and the non-three dimensional print region have identical coloration.

\* \* \* \* \*